United States Patent

[11] 3,630,501

[72] Inventor Hubert A. Shabaker
 Media, Pa.
[21] Appl. No. 65,770
[22] Filed Aug. 21, 1970
[45] Patented Dec. 28, 1971
[73] Assignee Air Products and Chemicals, Inc.
 Philadelphia, Pa.

[54] THERMAL TREATMENT OF POWDER
 7 Claims, 2 Drawing Figs.
[52] U.S. Cl. ........................................ 263/19 B,
 34/57 A, 165/104, 263/21 A, 263/52
[51] Int. Cl. ........................................ F27b 15/00
[50] Field of Search ........................... 263/19 B,
 21 A; 34/57 A; 165/104

[56] References Cited
 UNITED STATES PATENTS
 1,394,294 10/1921 Fasting ..................... 263/19 B
 2,557,655 12/1951 Grossman et al. ......... 263/52 X
 3,117,064 1/1964 Friedrich .................. 263/52 X Primary Examiner—John J. Camby
Attorneys—B. Max Klevit and John R. Ewbank ABSTRACT: Large uniformly sized inert ceramic balls are heated by combustion gases in a heating zone and then form a gravitating bed of hot ceramic balls in a reaction zone. The heat is transferred to particles of powder suspended in a gas moving upwardly countercurrently through the gravitating bed. The balls serve as a heat sink for narrowing the range of temperature for any endothermic reaction or exothermic reaction. Thus, the temperature of each particle of the suspended power is carefully scheduled. The temperature range is kept advantageously narrow in each zone in which a thermal reaction occurs. When raw kaolin is the suspended powder, meta kaolin is formed endothermally near the bottom of the gravitating bed. Deexothermed kaolin is formed higher in the bed at about 1,000° C. and the upflowing deexothermed kaolin powder further increases the temperature of the balls, thus decreasing the amount of heat input required in the heating zone for continuous calcination of the kaolin.

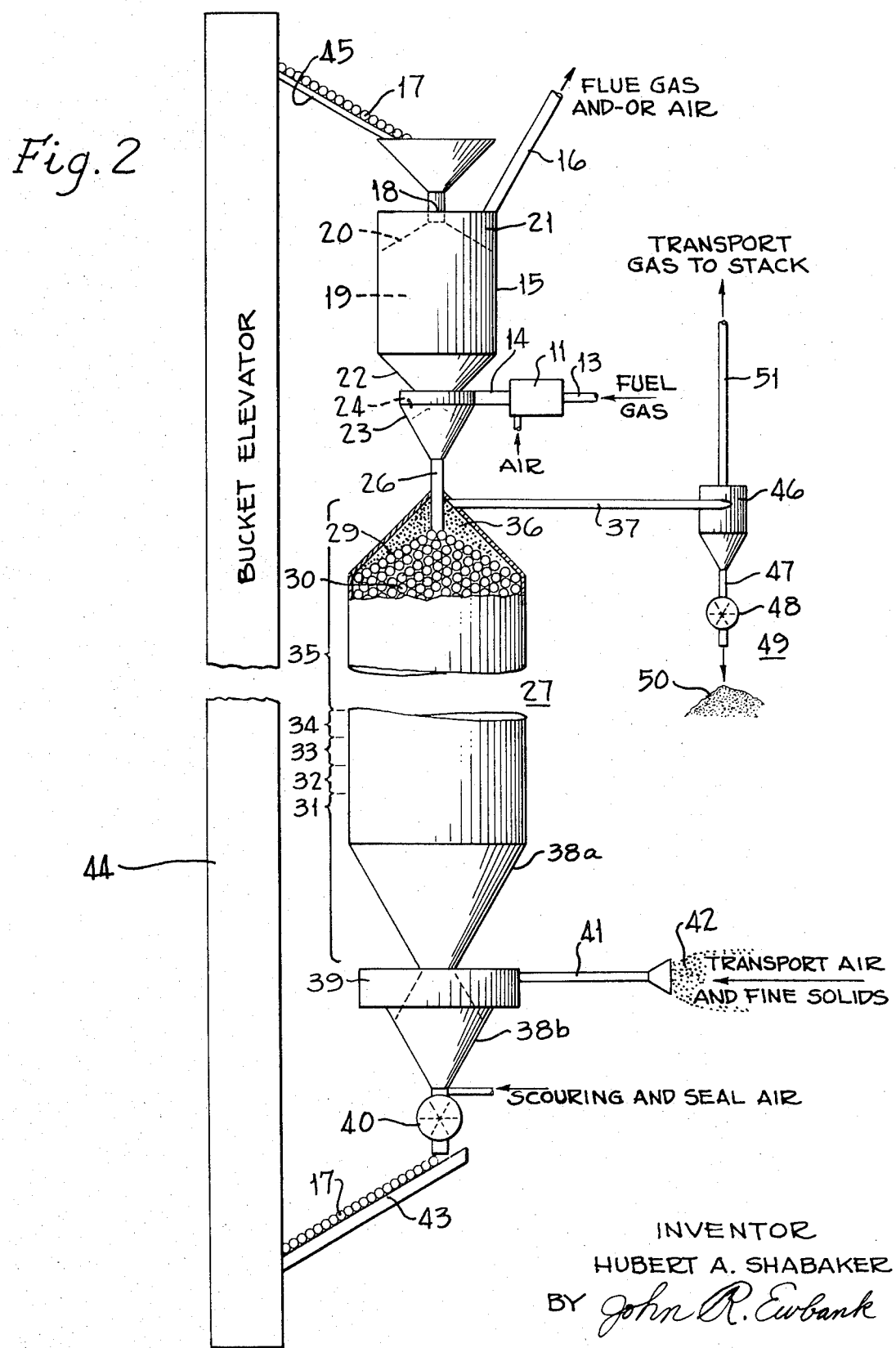

3,630,501

THERMAL TREATMENT OF POWDER

GENERAL BACKGROUND OF THE INVENTION

Heat treatment of powder in rotary kilns, multiple hearth furnaces, and/or other equipment has frequently led to globules, sintered aggregates, or otherwise objectionable final variations in product characteristics. Such objectionable results have been due to an excessively wide range of heat treatments for individual particles instead of uniformity of heat treatment.

Heretofore petroleum technologists have been familiar with two types of catalyst circulation systems for cracking heavy hydrocarbons. In a fluidized reactor, there has been a uniform temperature throughout the reactor and a wide range of residence time for individual particles. In gravitating bed crackers, there has been uniform residence time for the individual particles and a temperature gradient throughout the path of solids plug flow. For several decades petroleum technologists have been familiar with the advantages and disadvantages of each of the two competing systems for circulating catalyst particles, but have recognized that the two systems were mutually exclusive. No cracking system achieving all the advantages of both gravitating beds and fluidized beds was evolved.

Chemical engineers have selected either gravitating beds or fluidized beds for many other engineering projects involving transfer of heat. For example, gravitating beds of balls in "pebble heaters" have been employed in certain situations in which a gas stream was to be heated without contamination from flue gas and/or to a temperature above that attainable with practical metals in indirect heat exchange equipment.

SUMMARY OF INVENTION

Large uniformly sized ceramic balls are heated and the hot balls flow as a gravitating bed through a confined reactor. A powder suspended in a gas moves upwardly countercurrently to said gravitating bed. The heat applied to the balls serves primarily to heat the powder. Any endothermic reaction or exothermic reaction is maintained within a narrow temperature range by reason of heat sink effect. The heat of the exothermic reaction not only contributes toward heating the powder to the temperature required for the exothermic reaction, but also contributes toward heating the balls to their peak temperature.

BRIEF DESCRIPTION OF THE FIGURES

FIG. 2 is a schematic view of a gravitating bed system for preparing deexothermed kaolin powder by thermally treating kaolin suspended in an upwardly moving gas stream.

CLARIFICATION OF DRAWINGS

Figure 1:
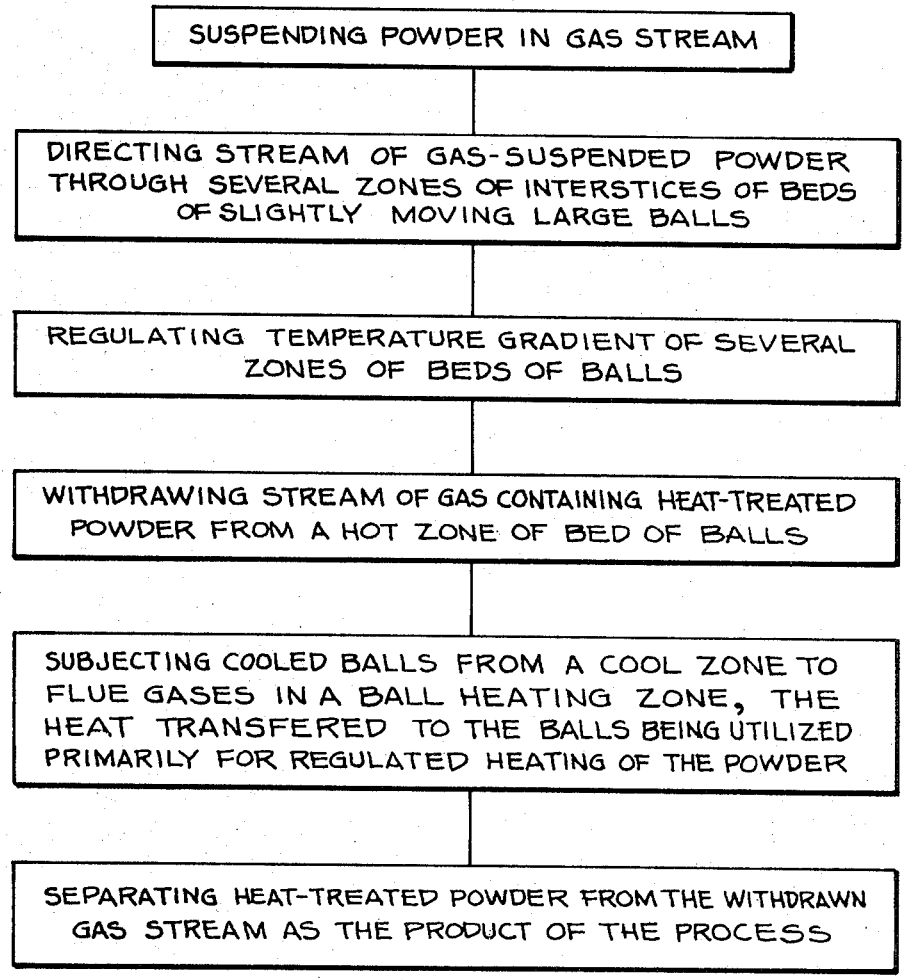
FIG. 1 is a self-explanatory flow sheet.

Any of several hydrated aluminum disilicates, including halloysite and kaolinite, can be converted to deexothermed kaolin by controlled calcination. It is convenient to make calculations concerning such calcination by treating it as involving five steps. Raw crystalline kaolin forms meta kaolin when heated to a dehydration temperature. The meta kaolin is heated to the temperature of the exotherm and then undergoes the critical reaction to form deexothermed kaolin, which is cooled to storage temperature. The five steps are: (1) heating, (2) formation of meta kaolin, (3) further heating, (4) formation of deexothermed kaolin, and (5) cooling deexothermed kaolin.

Describing in greater detail, raw kaolin is first heated to about 550° C. and is then converted to meta kaolin by heating at a temperature within a suitable range, for example a range from about 550° to 570° C. In addition to the heat for the first step raising the powder temperature, additional heat is required for the second step of the endothermic formation of meta kaolin which includes steam generation. Further heat is required for heating the meta kaolin in the third step from about 570° to about 990° C. It should be noted that much heat is evolved in the fourth step during the formation of deexothermed kaolin in a temperature range of about 990°–1,010° C., and the fifth step concerns the cooling of deexothermed kaolin to storage temperature.

As shown in FIG. 2, a calciner for heat-treating kaolin powder includes a burner 11, to which are supplied a stream of air through an inlet and a stream of fuel gas through inlet 13. The fuel gas from the combustion of the fuel gas flows through a flue 15 and upwardly through a heating zone 15 for discharge as a relatively cool gas through a chimney 16. Relatively cool ceramic balls 17 (e.g., alumina balls of approximately uniform diameter of 2 cm.) are supplied to the top of a funnel 18 and discharged onto a gravitating bed 19, having an upper conical surface 20, the conical angle being related to the free surface angle of repose of the balls. The flue gas flows upwardly through the gravitating bed in the heating zone 15 leaving through the ball bed surface 20 into a gas plenum zone 21 and then is discharged through the chimney 16. The heat from the combustion of the fuel in burner 11 is thus transferred to the balls 17 of gravitating bed 19.

Any apparatus for constricting the diameter (or cross-sectional dimension if not of the conventional circular cross section) of the gravitating stream of balls can be employed near the bottom of the heating zone 15, and such constriction of the diameter of the gravitating stream is symbolized by a conical zone 22, feeding a second stage of diameter constriction symbolized by the conical zone 23.

The flue gas from the flue 14 is injected into a gas engagement zone 24 at a pressure helping to force the gas upwardly through the gravitating bed 19 and toward the chimney 16. The temperature of the balls 17 leaving the heating zone 15 through seal leg 26 is adjusted to achieve certain predetermined effects in the reactor. Such adjustment is made by controlling the volume and temperature of injected flue gas. While passing upwardly through the gravitating bed 19, the flue gas is cooled as the balls are heated.

The hot balls (e.g., at 200° C. during certain operating conditions) flow through a seal leg 26 to the top surface 29 of a gravitating bed 30 in reactor 27. The drawing discloses a product withdrawal plenum 36 containing heat-treated powder suspended in the gas stream, which is removed from the reactor through a product withdrawal conduit 37 communicating with plenum 36.

The vessel in which the powder is subjected to heat treatment is conveniently designated as reactor 27 even though the actions occuring therein can also be described as the heat treatment of a powder. It is convenient to designate five hypothetical zones within the reactor, the zones corresponding to various aspects (e.g., five steps) of the manufacture of deexothermed kaolin. Calculations concerning heat transfer requirements are simplified by a five-zone approach. There are significant temperature differences between the bottom and top of each of the three odd-numbered zones. The second and fourth zones involve chemical reactions absorbing and generating much heat but there are relatively small differences in the temperature of the powder between the bottom and top of these two even-numbered zones. Because the division into five zones is intended primarily to simplify calculations, it should be recognized that any arbitrary assignment of imaginary horizontal planes for separating zones or levels in the reactor would be transistory. Classification within one of the five steps of deexothermed kaolin manufacture is more significant than the height above the bottom of the reactor, partly because conditions overlap above and below each imaginary plane, and such overlapping conditions favor simultaneous progress of each of two successive steps.

Near the bottom of the reactor 27 is a first zone 31 in which kaolin powder, suspended in air, can be heated from about ambient temperature (e.g., 20° C.) to a temperature such as 550° C. A second zone 32 permits the dehydration of the raw kaolin to form meta kaolin throughout a temperature range of about 550° to 570° C. Because of the narrow temperature 550°–570° C. the calculations are approximately the same as if the second zone were maintained at 560° C. The meta kaolin flows upwardly through a third zone designated as 33 in which it is heated to a temperature such as 990° C. by the descending high-temperature balls. The upflowing suspension of powdered kaolin is deexothermed in a fourth zone designated as 34, starting at about 1,000° C. and rising only a few degrees as evolved heat is absorbed by the lower temperature balls entering the upper level of the powder-deexotherming zone.

Particular attention is directed to the availability of the gravitating bed as a heat sink whereby the temperature range of the exothermic reaction is maintained within a very narrow range, thus avoiding the temperature-zooming propensities of the exothermic reaction. A flywheel effect is achieved such that once started, the exothermic reaction continues, thus generating the heat for maintaining the system at a maximum temperature on the order of 990°–1,010° C. but within the indicated advantageously narrow temperature range through the fourth zone, 34.

The stream of hot gas and hot powder flowing upwardly from the fourth zone 34 is cooled from about 1,000° C. to about 240° C. (or other appropriate temperature) by the downflowing bed of gravitating balls in a fifth zone, 35. It can be noted that in the fifth zone 35, the powder is hotter than the balls thus heating the balls in the fifth zone, thereby differing from the first, second, and third zones, in which the balls are hotter than the powder, thus heating the powder. The suspension of powdered deexothermed kaolin in the gas stream separates from the gravitating bed in a plenum zone 36 above the top 29 of the gravitating bed and is withdrawn through conduit 37 at a temperature near 240° C.

During startup, balls are circulated and heated to provide a plurality of temperature zones (strata at various heights about the bottom of the bed in the reactor 27) corresponding approximately to the temperature gradient desired during operation, including a stratum (e.g., 10 inches deep) of balls at about 1,010° C. in an upper portion of the reactor, and strata at 900°, 800°, 560°, 120° C., intermediate temperatures, etc., for simulating operational patterns. After the desired temperature gradient has been established in reactor 27, flow rates of the balls and upflowing air are adjusted and then readjusted when powder flow is started and deexothermed kaolin product is withdrawn. After all flow controls are optimized, the temperature gradient can be maintained by heating the balls at a temperature significantly below the approximately 1,000° C. temperature of the exotherm. The effectiveness of the gravitating bed in decreasing the fuel consumption (i.e., heat input) required to prepare deexothermed kaolin constitutes one of the important advantages of the this method of heat-treating a powder.

In the main portion of the reactor, the diameter of the cross section of the bed is at least several decimeters. At the bottom of the reactor, the diameter of the cross section of the gravitating bed is constricted through appropriate means, symbolized by the combination of a funnel 38a discharging into a funnel 38b, thereby providing a gas-engaging plenum 39 into which a gaseous suspension of raw kaolin powder flows through an injection conduit 41. Finely divided particles 42 of raw kaolin are suspended in a transport gas stream, ordinarily an airstream, directed through the injection conduit 41 and thus upwardly through the gravitating bed to the withdrawal conduit 37.

Within the gravitating bed 30 in reactor 27, there are interstices in which the upflowing suspension of powder has contact with the slowly gravitating balls to achieve excellent heat transfer between the upflowing gas-powder mixture and the gravitating balls. The interstices are constantly changing in shape and the interconnections among the interstices are changing. At any moment, each interstice is likely to have a somewhat smaller top portion and a somewhat smaller bottom portion and a somewhat larger middle portion. The upward gas velocity is inversely related to the cross-sectional area of each level of each interstice, so that there are changes in the upward gas velocity and changes in the upward powder particle velocity in the upward flow through any particular interstice. The heat content of the powder is generally much greater than the heat content of the transport gas either on the hourly flow basis or instantaneous basis.

In some instances, a fluidized bed can exist within at least a portion of a particular interstice. The upflowing stream of suspended powder and gas transfers heat to and from the gravitating balls substantially the same as if the major portion of the interstices functioned as fluidized beds of particles. Within a significant portion of the interstices, some of the movement of powder particles has randomness characteristics typical of a fluidized bed. However, the flow of powder particles between interstices is not random, but predominantly upward. The ratio of upward movement to downward backflow movement of powder particles between interstices is extremely large, thus justifying the classification of the powder flow as substantially plug flow upwardly through successive interstices. The combination of the gravitating bed and the upflowing suspension of powder provides not merely the plug flow of the powder through the heat treatment zone but also the advantageous heat transfer characteristics between the powder and the balls as if each interstice were a microsized fluidized bed reactor.

A star valve 40 is rotated at a speed which controls the flow rate for the gravitating balls. The balls 17 flow from the gravitating bed 30 through the star valve 40 and down a chute 43. A stream of air can be injected just above the star valve to scour powder from the discharged balls and to seal the funnel 38b at a pressure above atmospheric pressure. The balls flow down the chute 43 to a bucket elevator 44, which lifts the balls to a chute 45 through which the balls 17 are fed to the funnel 18 and thus back to the heating zone, 15. The choice of system for elevating the balls for recirculation is an engineering option, and a gas lift or screw lift or other expedient might be substituted for the bucket elevator.

A product recovery system includes a cyclone separator 46 having a powder discharge tube 47 and a star valve 48 through which heat-treated powder 50 can flow to a discharge station 49. The heat-treated kaolin is characterized by the absence of overcalcined powder, whereby there is substantial avoidance of production of globules or aggregates resulting from melting or sintering of the powder by excessive temperature. The powdered product 50 differs from the feed powder 52 primarily in that it has been subjected to the controlled heating in the reactor.

The warm transport gas separated from the cyclone 46 can be discharged through a chimney 51. If desired, the transport gas withdrawn from cyclone 46 can be employed to warm the balls prior to their delivery to the heating zone 15, or a suitable portion of the transport gas can be recycled as transport gas, or other suitable modifications can substitute for the illustrated discharge of transport gas through the chimney 51.

DESCRIPTION OF A FEW PREFERRED EMBODIMENTS

The nature of the invention is further clarified by reference to some nonlimiting illustrative examples.

EXAMPLE 1

Calculations show that heat balance is attainable in a system featuring apparatus of the type schematically shown in FIG. 2. A gravitating bed of fused alumina balls having a diameter of about ¾ inch gravitates through a reaction zone at a flow rate of about 20,400 lbs. per hour. Near the bottom of the bed, a suspension of raw kaolinite powder in air is injected at a pressure adapted to bring about the upflow of the air and hydrated alumino disilicate (i.e., kaolinite). The air flow rate is about 24,000 cubic feet (about 1,938 pounds) per hour. Raw kaolinite is injected at a rate of 6,978 lbs. of kaolinite per hour, and the 8,916 pounds per hour of suspension moves upwardly to the first zone, in which the raw kaolinite is heated from about ambient temperature to about 550° C. (about 1,022° F.) involving an absorption of about 2,395,560 B.t.u.'s per hour from the gravitating bed. It is convenient to define zones to separate the heat requirements of the successive steps of the heat treatment of a particle and to recognize that sharp boundary planes between different levels of the gravitating bed are not feasible. Overlapping of such theoretical zones inherently features practical operation of the countercurrent heating of a suspended powder in a gravitating bed. Illustrative heat calculations are approximated so that ±25° F. or ±14° C. differences of temperature have little significance.

The suspended kaolinite advances upwardly into a second zone, in which the raw kaolinite is converted to meta kaolin, the temperature rise allocation being from 550° C. to 570° C. (1,022° to 1,058° F.). The upflowing suspension absorbs from the gravitating balls 4,020,00 B.t.u. per hour. Formation of meta kaolin generates 978 lbs. of steam per hour. The upwardly moving gas stream, comprising the mixture of air and steam, suspends the particles as they advance upwardly through a third zone, wherein by the absorption from the gravitating balls of 1,855,130 B.t.u. per hour, the temperature is raised from 570° C. to about 990° C. (1,058° to 1,814° F.).

Particular attention is directed to a fourth zone, in which the upflowing gas stream of suspended meta kaolin, steam, and air go through a zone in which the kaolin exotherm occurs, thereby releasing 4,530,000 B.t.u. per hour from the upflowing aluminosilicate powder, which heat is absorbed by the gravitating bed. In this example, the net exotherm amounts to 755 B.t.u. per pound of calcined kaolin, but as noted elsewhere, a wide range of values for the kaolin exotherm has been reported in the literature. The temperature increase allocated to he fourth zone is from 990° to 1,010° C. (1,814° to 1,850° F.) and it is the narrowness of this range which is advantageous.

The deexothermed kaolin passes upwardly through a fifth zone in which the gravitating balls are heated, there being a transfer of about 3,710,250 B.t.u. per hour from the upmoving stream to the gravitating balls, whereby the powder is cooled form about 1,010° C. to about 240° C. (1,850° to 464° F.). The balls are cooler than the upflowing suspension in the fifth zone, thus differing from the phenomena of balls hotter than the upflowing suspension in the first, second and third zones.

In the gravitating bed, approximately 40 percent of the volume consists of interstices. A plurality of small fluidized beds occupy the interstice space among the gravitating balls, the gas velocity being sufficient to lift particles from the top of one fluidized zone to the bottom of another until the powder leaves the top of the gravitating bed. The fact that the shape of each interstice is narrow at top and bottom but wide at the middle, assures a far greater residence time for each powder particle than would be true for a gas lift, and helps to favor the existence of fluidized beds in a large number of the interstices.

The amount of air employed for suspending the alumino disilicate during its upward passage through the gravitating bed can be the quantity necessary for providing the series of fluidizable beds and still permitting the aluminosilicate powder to move upwardly at the desired rate, that is 6,000 pounds per hour of the heat-treated product or 6,978 pounds per hour of the raw kaolinite. For heat calculations, it was assumed that the quantity of air would be 1,938 pounds, or 24,000 cubic feet per hour, but the heat transfer calculations follow a similar pattern without regard to the ratio of weight or raw kaolin to weight of air.

In making the calculations, it was assumed that the kaolin particles had a size distribution typical of fluidizable particles, comprising particles from about 20 microns to about 140 microns, with the average diameter about 60 microns and with the largest particles about 150 microns. The specific heat of the fluidized raw kaolin is about 0.29 B.t.u. per pound per degree F. The specific heat of the air is about 0.26 B.t.u. per pound per degree F. The inert ball has a specific heat of about 0.27 B.t.u. per pound per degree F.

The heat transfer between the gas stream containing suspended kaolin powder and the gravitating balls is excellent at each level of the bed. Approximate calculations can be based upon the convenient assumption that the balls, the gas, and the powder in each imaginary plane of the fourth zone of exotherm of the kaolin are all at the same temperature. In the first, second and third zones, the balls are hotter than the kaolin powder which is heated from ambient to about 990° C. while undergoing the endothermic formation of meta kaolin and steam. In the fifth zone the balls are cooler than the upflowing stream of air, steam, calcined kaolin powder, and said stream is cooled from about 1,000° C. to an appropriate temperature such as 240° C. Such final temperature of the powder is dependent in part upon the airflow rate employed in the process and in part by the magnitude of the kaolin exotherm. Measurements of different samples of kaolin by different investigators have provided reports of exotherm values throughout a range which was ±67 percent of the median value. Any imperfection in the crystallinity of the raw kaolin seems to radically reduce the magnitude of the exotherm, as does the presence of trace amounts of impurities such as Titania. A kaolin of a type much used in cracking catalyst manufacture contains about 2 percent Titania and an exotherm value of about 755 B.t.u./lb. of deexothermed kaolin, and this value was employed in calculations as being the most reliable pertinent data available.

EXAMPLE 2

Deexothermed kaolin powder is prepared in a gravitating bed following the general procedure of example 1 except that meta kaolin powder is the starting material. The alumina balls provide a heat sink for stabilizing the exothermic reaction within a narrow temperature range such as from 990° to 1,010° C. It is noted that the uniformly-sized balls (average diameter between 1 to 5 cm.) provide the heat transfer function because they are slightly moving, so that the suspension of powder never becomes impacted in an interstice, as could occur if a plurality of fixed ball beds were treated with a gas-suspended powder.

EXAMPLE 3

Natural gas is burned to provide flue gas which is directed through a bed of gravitating balls of alumina in a heating zone. The 2 cm. balls gravitate through a seal leg, and are then transferred to the upper portion of a reactor having a gravitating bed of such alumina balls. At the top of the reactor's gravitating bed, the alumina balls are quite hot and at the bottom of the reactor, the gravitating balls are significantly cooler. Near the bottom of the reactor, a mixture of air and kaolinite powder is blown in at a pressure adapted to permit the gas stream to flow toward the top of the bed and to permit the kaolin powder to form a series of fluidized beds in the interstices of the gravitating bed. The powder is lifted from one fluidized bed to another so that the powder does flow upwardly with the gas stream with little backflow from a fluidized bed to a lower bed. Near the bottom of the bed, the kaolin is heated from about ambient temperature to about the temperature at which the raw kaolin is dehydrated to form amorphous meta kaolin. In an intermediate portion of the gravitating bed, the meta kaolin is heated from its hydration temperature to an elevated temperature such as 990° C. In the zone of the bed maintained at a temperature of about 1,000° C. the kaolin undergoes an exotherm attributable to the transformation of the amorphous meta kaolin to an amorphous deexothermed aluminosilicate in which they are no large amounts of mullite detectable by X-ray diffraction. This transitional material is particularly useful as an intermediate in catalyst manufacture, and differs significantly from either meta kaolin, or the mixture of mullite and silica which results from heating of such amorphous deexothermed kaolin at a temperature such as 1,200° C. or a few days of treatment at 1,000° C. An important feature is the transfer of heat from the stream of upflowing powder and gas to the gravitating balls, so that the exothermic reaction does not increase the temperature of the upflowing stream significantly. Thus the temperature range of the zone of the exothermic reaction is narrowed, and this stabilization of the exothermic reaction (i.e., curtailing the propensity of the exothermic reaction to promote temperatures significantly above the desired operating temperature) constitutes one of the significant advantages of heat-treating a powder in a gravitating bed.

Powdered amorphous deexothermed kaolin, whatever its method of manufacture, can be subjected to certain tests for evaluating the quality of the product. Thermal differential analysis apparatus permits the detection of the residual exotherm, which must be less than 15 percent of the exotherm of meta kaolin to meet catalytic grade specifications. Similarly catalytic grade specifications require that the amount of mullite detectable by the most sensitive X-ray diffraction procedure be less than 15 percent of the mullite which can be recognized by X-ray diffraction of an adequately heated sample. Although 15 percent is set as an upper limit for the precursor for catalyst manufacture, specifications sometimes require less than 3 percent or even less than 1 percent for each of the two contrasting properties, that is, the residual exotherm and X-ray detectable mullite. The specifications for pigment grades of deexothermed kaolin can sometimes differ from those for catalytic grades. Variations in raw clay intensify the difficulties of manufacturing deexothermed kaolin to satisfy any set of specifications. The gravitating bed type of powder kiln has important advantages over previous powder kilns because of its unique flexiblity in adapting production to respond to variations in customers' specifications and/or variations in the raw clay.

From the top of the reactor, there is withdrawn a stream of hot air containing the suspended amorphous deexothermed kaolin and this is withdrawn to a cyclone. The cyclone permits the separation of powdered deexothermed kaolin product and the withdrawal of a gas stream. If desired, heat exchanging means can be provided for extracting residual heat from the gas stream from the cyclone.

EXAMPLE 4

Through a reactor having a gravitating bed of hot alumina balls there is directed a stream of powdered coal suspended in hydrogen as the powdered coal moves upwardly through the series of fluidizable beds, it undergoes the series of pyrolysis reactions for the formation of hydrocarbon vapors and powdered coke. From the top of the reactor, there is withdrawn a gas stream comprising the hydrocarbon vapors, powdered coke, and hydrogen. The valuable products are withdrawn from said stream. The cool balls withdrawn from the bottom of the reactor have a carbonaceous deposit, which is burned from the balls in a heating zone and the hot balls are recirculated to the reactor. Thus a minor portion of the powdered coal (the carbonaceous deposit) indirectly provides the fuel for the pyrolysis of the major amount of the powdered coal.

EXAMPLE 5

A fluidizable catalyst consisting of about 10 percent nickel on gamma alumina is directed upwardly through a gravitating bed of alumina balls having a diameter of about ¾ inch. Means are provided for circulating the balls through such gravitating bed. The nickel catalyst is suspended in a gas stream which, at the entry of the reactor, consists of a mixture of about 13 moles of hydrogen and 1 mole of benzene. Within the series of fluidizable beds, as the catalyst and vapors are moving upwardly, the reactant stream is heated, and then the benzene is hydrogenated to cyclohexane, thereby heating the alumina balls by reason of the exothermic nature of the hydrogenation of benzene. The temperature of the reactant stream is stabilized by the gravitating bed. From the top of the reactor there is withdrawn a gas stream comprising the suspended fluidizable catalyst and the gaseous mixture of cyclohexane and hydrogen cooled to below peak temperature by heat transfer to an upper portion of the gravitating bed. By the use of a cyclone, the catalyst is recovered for recycling through the reactor. The hydrogen in the effluent stream is also recirculated. The temperature of the reactant stream is carefully controlled by reason of the effectiveness of the alumina balls in absorbing the exothermic heat of the hydrogenation reaction.

Various modifications of the inventions are possible, and the examples should be used as illustrative of the advantages of employing a gravitating bed of uniformly sized balls for controlling the heating of a powder suspended in a gas and directed upwardly through the gravitating bed.

The invention claimed is:

1. The method of controlling the temperature of a powder while heat-treating the powder in a gas stream having a temperature gradient, which method includes the steps of:

heating uniformly sized inert ceramic balls to a preselected elevated temperature by contact in a ball-heating zone with the gases from the combustion of a fuel;

directing balls from said ball-heating zone to the top of a gravitating bed within a reactor, said balls gravitating at a controlled rate to the bottom of said reactor, and said balls being cooled to a predetermined lower temperature during passage through said reactor, and said cooled balls being withdrawn from the bottom of said reactor and recirculated to said ball-heating zone:

directing upwardly countercurrently through the gravitating bed a stream of suspension consisting of a mixture of gas and suspended powder, the flow rate of the exit stream of suspension suspending therein a predetermined quantity of powder per unit time, said predetermined rate of powder flow being suspended in the entry gas stream, the flow rate of the stream at the entry stream being regulated to maintain aid exit flow rate after passing upwardly through the interstices among said gravitating balls in said reactor, and any gas generated or consumed within said reactor being deemed a part of the gas stream, the heat associated with any endothermic or exothermic reaction within said reactor being rapidly transferred to or from said gravitating balls by reason of the control of the flow rate of the powder particles and the control of the flow rate of the balls for the predetermined heat transfer effects; and separating said exit stream of suspension into heat-treated powder and a stream of heat-treated gas free from powder.

2. The method of claim 1 in which an exothermic reaction occurs below the top of the gravitating bed in the reactor, whereby the heat of the exothermic reaction is at least partly transferred to the gravitating balls to more accurately control the exothermic reaction and to decrease the energy input for continuously heating the powder to the temperature at which the exothermic reaction occurs.

3. The method of claim 2 in which the particles of powder undergo an exothermic reaction while moving upwardly through a portion of the gravitating bed.

4. The method of claim 2 in which the particles of powder undergo both an endothermic reaction and an exothermic reaction while moving upwardly through various portions of the gravitating bed.

5. The method of claim 1 in which the particles of powder suspended in the entrance gas stream are hydrated aluminum disilicate particles, and particles of deexothermed kaolin powder are withdrawn, and in which the heat resulting from the kaolin exotherm is transferred to the gravitating balls, whereby the heat evolved by the exotherm provides a portion of the heat for the endothermic formation of meta kaolin from hydrated aluminum disilicate, and whereby the zone in which the exotherm occurs is maintained at such a precisely regulated narrow range of temperature that significant sintering of the deexothermed kaolin particles together to form aggregates is substantially prevented.

6. In a method of subjecting powder to a controlled increase of temperature, the improvement which includes the steps of:

providing at least one confined bed of relatively large, substantially uniformly sized balls of heat transfer material which are subjected to a slight amount of slow movement, the diameter of said slightly moving balls being a uniform size within the range from about 1 to about 5 centimeters, the minimum cross section of said bed being at least several decimeters, whereby there are a plurality of zones of slightly moving balls in a reactor zone, there being a plurality of interstices among said uniformly sized balls in each zone;

providing a system for relative movement between a hereinafter defined stream of gas containing suspended powder and said plurality of zones of said slightly moving balls;

heating said slightly moving balls in a ball heating zone to a heating zone temperature;

establishing a reliable temperature gradient throughout a reactor zone consisting of a plurality of successive temperature zones, the temperature of said slightly moving balls being accurately regulated so that each temperature zone has a preselected range of temperature, a temperature zone at the gas entry to the reactor zone being at a preselected lower temperature and a temperature zone at the gas exit of the reactor zone being approximately at said heating zone temperature;

directing an entry stream of gas into the reactor at said zone maintained at said preselected lower temperature; controlling the flow rate of said entry gas stream and the flow rate of the exit gas stream to suspend therein a preselected rate of powder flow, the amount of powder suspended in the entry gas stream being an amount adapted to provide said preselected flow rate of powder in said exit gas stream, and directing a gas stream containing said amount of suspended powder successively through a predetermined path of zones of said slightly moving balls, whereby the powder in the exit gas stream from the last-contacted zone has a temperature which is not remote from said heating zone temperature, any gas consumed or generated in said reactor zone being treated as a part of the gas stream;

transferring heat between said slightly moving balls and the suspended powder, whereby the temperature of each particle of powder is controlled in a reliable manner, any exothermic reaction or endothermic reaction occurring within said reactor zone being instantly controlled by heat transfer involving said powder particle and said slightly moving balls;

withdrawing an exit gas stream containing said suspended powder from a zone of the balls maintained at near said preselected elevated temperature; and separating heat-treated powder and heat-treated gas from said withdrawn exit gas stream.

7. The method of claim 6 in which balls, cooled by contact with said stream of gas containing suspended powder, are recirculated from the bottom of a gravitating bed to the top of a gravitating bed and in which various zones of the gravitating bed are maintained at different temperatures, including the preselected temperature of the heating zone, and in which the exit gas stream containing the suspended powder is withdrawn below said heating zone, and in which the gas stream containing suspended powder is injected into the gravitating bed at a zone near that at which the balls are withdrawn for recirculation.

* * * * *

PO-1050
(5/69)

UNITED STATES PATENT OFFICE
CERTIFICATE OF CORRECTION

Patent No. __3,630,501__   Dated __December 28, 1971__

Inventor(s) __Hubert A. Shabaker__

It is certified that error appears in the above-identified patent and that said Letters Patent are hereby corrected as shown below:

Column 1, line 42 "by reason of heat sink effect" should read --by reason of the heat sink effect--

Column 2, line 9 "The fuel gas from" should read --The flue gas from--

Column 2, line 10 "flue 15" should read --flue 14--

Column 3, line 51 "of the this method" should read --of this method--

Column 4, line 45 "52" should read --42--

Column 5, line 14 "4,020,00" should read --4,020,000--

Column 5, line 31 "he" should read --the--

Column 5, line 38 "form" should read --from--

Column 6, line 56 "hydration" should read --dehydration--

Column 6, line 61 "they" should read --there--

Column 8, line 25 "aid" should read --said--

Signed and sealed this 11th day of July 1972.

(SEAL)
Attest:

EDWARD M. FLETCHER, JR.
Attesting Officer

ROBERT GOTTSCHALK
Commissioner of Patents